L. YALE, Jr., dec'd.

S. N. BROOKS, Adm'r, Assignor to THE YALE LOCK MANUFACTURING CO.

Post-Office Box.

No. 8,783. Reissued July 1, 1879.

WITNESSES

Wm A. Skinkle.

Geo W Breck.

INVENTOR

The Yale Lock Manufacturing Co

Assignees of Linus Yale Jr deceased

By their Attorneys,

Baldwin, Hopkins, & Peyton.

N. PETERS, PHOTO-LITHOGRAPHER, WASHINGTON, D. C.

UNITED STATES PATENT OFFICE.

THE YALE LOCK MANUFACTURING COMPANY, OF STAMFORD, CONNECTICUT, ASSIGNEE OF S. N. BROOKS, ADMINISTRATOR OF L. YALE, JR., (DECEASED.)

IMPROVEMENT IN POST-OFFICE BOXES.

Specification forming part of Letters Patent No. 119,212, dated September 19, 1871; Reissue No. 4,963, dated July 9, 1872; Reissue No. 7,625, dated April 24, 1877; Reissue No. 8,783, dated July 1, 1879; application filed May 23, 1879.

*To all whom it may concern:*

Be it known that LINUS YALE, Jr., (deceased,) late of Shelburne Falls, in the county of Franklin and State of Massachusetts, during his lifetime invented a new and useful Improvement in Post-Office Boxes; and THE YALE LOCK MANUFACTURING COMPANY, assignee of the entire right and title to said invention, does, by its president, hereby declare that the following is a full, clear, and exact description thereof, sufficient to enable others skilled in the arts to understand, make, and use the same, reference being had to the accompanying drawings, forming part of this specification, in which—

Figure 1:
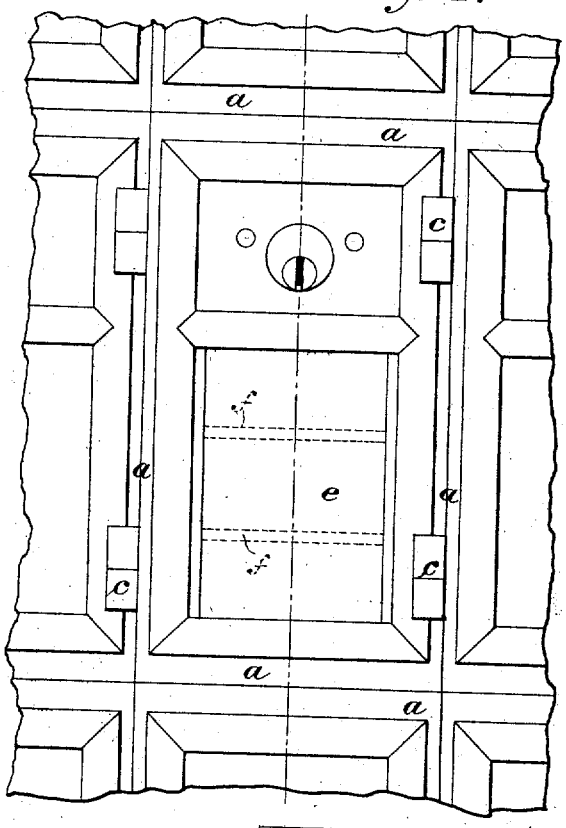
Figure 2:
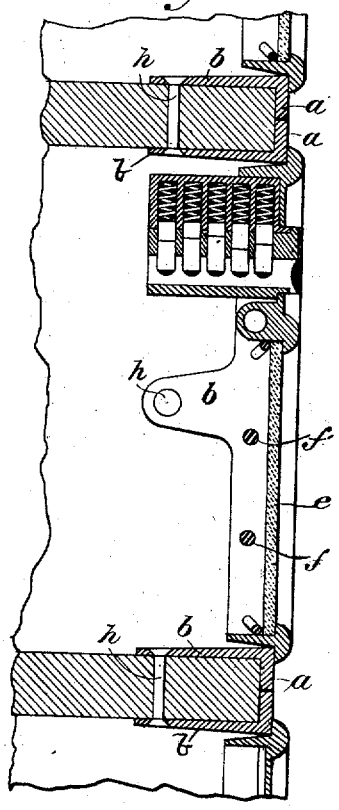
Figure 3:
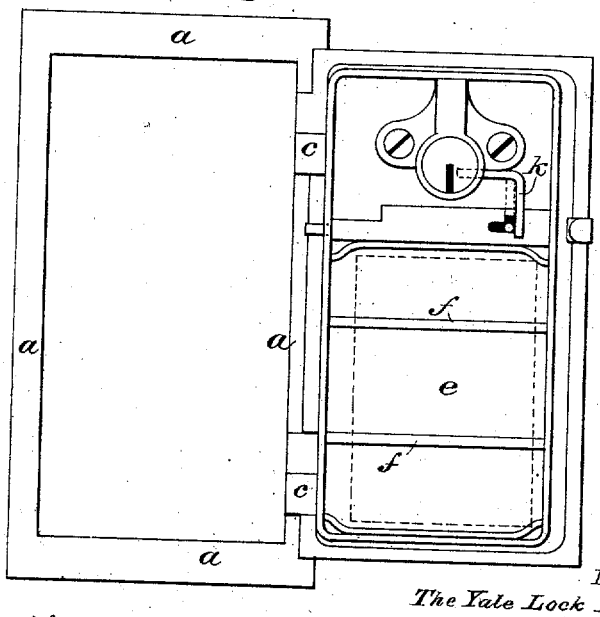

Figure 1 is an elevation taken from the front or delivery side of a series of boxes. Fig. 2 is a vertical section through the same, and Fig. 3 is a front elevation of a single box-frame with the door open.

This invention consists in an improvement in the construction of post-office boxes; and its chief feature is the combination of a tier of pigeon-holes made of wood with a continuous frontage of metal, such frontage consisting of doors and their frames, which latter cover the ends of the boards which form the pigeon-holes. A series of wooden pigeon-holes open at the rear and covered at the front or on the outside by a permanent glass front is very old, and such a series was used for post-office boxes and in hotels as a receptacle for keys, cards, letters, &c. There has also been in use a series of wooden pigeon-holes, each provided at one end with a door, as described in the patent granted to Jacob H. Beidler, May 28, 1866; but in this patent the door is described as hinged to the wood, and the construction is, consequently, insecure, as an ordinary pocket-knife or small chisel will, even in inexperienced hands, suffice to cut away the wood or pry off the door, so that the boxes may be entered.

Pigeon-holes made of iron or other metal are difficult to construct and very costly; but such pigeon-holes, each provided with an ordinary metal door, would be sufficiently secure. Such a degree of security at comparatively a low cost is attained by covering the front of a series of wooden pigeon-holes with a continuous metallic frontage—that is, a frontage which presents a continuous surface of metal, or, in other words, a surface which covers the ends of the wooden pigeon-holes in such manner that those portions of the wood to which the metallic frames are attached cannot be attacked when the doors making part of the frontage are closed. In constructing YALE'S invention the body of the boxes or the series of pigeon-holes is to be made of wood in any usual manner, and the fronts thereof—viz., the doors and their frames—are to be made of iron or other suitable metal.

Each door-frame is of such size that it aids in covering the ends of the wooden partitions that form the pigeon-holes to which it is applied, and these frames (see Fig. 1) are of such size and shape that where a series of them are combined with a series of pigeon-holes they cover the whole of the ends of the wood.

Each door-frame is a plate of metal, *a a*, which, when in place, overlaps a part of the ends of the wood-work surrounding the pigeon-hole, the outside of the frame inclosing a greater area than the orifice of the pigeon-hole, and each frame has an ear, *b b*, which enters the pigeon-hole; but this ear may be either continuous or notched out at intervals. The door is of iron or other metal, solid at top, and having an opening, *e*, below, in which a plate of glass is secured, and is hinged to the frame, as at *c c*. It is preferable to locate rods *f f* behind the plate, so as to prevent the introduction of a hand if the glass be broken, and so to form and hinge the door that when shut it enters within the frame, so that it cannot be lifted from its hinges when shut.

When the frames are all in place each frame is riveted or bolted to the wood-work to fasten it thereto, and is also riveted or bolted to its four neighbors to secure the frames to each other. (See *h h*, Fig. 2.) Thus each frame is secured to the wood-work, so that it cannot be removed till the rivet or the wood-work is cut away or broken.

When all the frames are in place a continu ous metallic frontage, protecting the wood work, is presented upon the outside of the series of boxes—that is, the side where the public can approach the boxes.

Each door has a lock attached to it, the bolt of which is actuated through the intervention of an arm, *k*, in the manner and for the purposes set forth in a patent granted for the invention of Linus Yale, Jr., on the 24th day of October, 1871, No. 120,177.

An iron door in an iron frame is not claimed as of YALE'S invention, as such doors have been used in safe-vaults and for furnaces.

What is claimed as the invention of said LINUS YALE, Jr., (deceased,) is—

1. The combination, substantially as specified, of a series of metallic door-frames and doors with a series of wooden pigeon-holes, whereby a series of post-office boxes with a continuous metallic frontage is formed.

2. The combination, substantially as described, of a series of wooden pigeon-holes with a series of metallic door-frames and doors, and with rivets or bolts which attach the frames to the wood-work, whereby a continuous metallic frontage secured to the wood-work of pigeon-holes is obtained.

3. The combination, substantially as described, of a series of wooden pigeon-holes with a series of metallic door-frames and doors, and with rivets or bolts which attach the frames both to the wood-work and to each other, the combination being substantially such as described.

4. The combination of a metallic door with a glass panel, and with a frame to which the door is hinged, said frame being so constructed as to cover a part of the ends of the wooden partitions forming pigeon-holes and being applied thereto, the combination being substantially as specified.

5. The combination of a post-office box or pigeon-hole open at the rear with a metallic frame and door to protect the front end of it.

In testimony that the said company claims the foregoing it hereunto affixes its hand and seal this 14th day of May, A. D. 1879.

THE YALE LOCK MFG. CO., [L. S.]
By HENRY R. TOWNE, *President.*

Witnesses:
SCHUYLER MERRITT,
FRANKLIN UNDERHILL.